United States Patent
Heise

[19]

[11] Patent Number: 6,144,127
[45] Date of Patent: Nov. 7, 2000

[54] ASSEMBLY OF MOTOR AND CONTROL UNIT

[75] Inventor: Andreas Heise, Mörfelden, Germany

[73] Assignee: Continental Teves AG & Co. OHG, Germany

[21] Appl. No.: 09/171,621

[22] PCT Filed: Apr. 10, 1997

[86] PCT No.: PCT/EP97/01780

§ 371 Date: Apr. 19, 1999

§ 102(e) Date: Apr. 19, 1999

[87] PCT Pub. No.: WO97/40570

PCT Pub. Date: Oct. 30, 1997

[30] Foreign Application Priority Data

Apr. 22, 1996 [DE] Germany .......................... 196 15 706

[51] Int. Cl.[7] .................................................. H02K 11/00
[52] U.S. Cl. ........................................ 310/71; 310/68 R
[58] Field of Search ................................. 310/68 R, 71; 439/76.1, 76.2, 843, 844, 845

[56] References Cited

U.S. PATENT DOCUMENTS

| | | | |
|---|---|---|---|
| 3,670,409 | 6/1972 | Reimer | 29/853 |
| 4,187,388 | 2/1980 | Roberts | 174/68.5 |
| 4,451,750 | 5/1984 | Heuer et al. | 310/71 |
| 4,475,873 | 10/1984 | Jensen et al. | 310/71 |
| 4,963,778 | 10/1990 | Jensen et al. | 310/68 D |
| 5,038,467 | 8/1991 | Murphy | 439/852 |
| 5,331,239 | 7/1994 | Kwun et al. | 310/68 R |
| 5,491,370 | 2/1996 | Schneider et al. | 310/54 |
| 5,938,484 | 8/1999 | Beege et al. | 439/828 |

FOREIGN PATENT DOCUMENTS

| | | |
|---|---|---|
| 78 29 256 | 2/1979 | Germany . |
| 37 43 168 | 6/1989 | Germany . |
| 40 15 080 | 1/1992 | Germany . |
| 44 11 152 | 10/1994 | Germany . |
| 94 13 844 | 10/1994 | Germany . |
| 43 20 005 | 1/1995 | Germany . |
| 44 11 960 | 10/1995 | Germany . |
| 44 30 953 | 3/1996 | Germany . |

Primary Examiner—Clayton LaBalle
Attorney, Agent, or Firm—Rader, Fishman & Grauer PLLC

[57] ABSTRACT

An assembly is introduced which consists of an electric motor (1), an intermediate housing (2) and a control unit (3) and which is adapted for easy mounting. Such assemblies are often used in brake systems where the intermediate housing (2) receives a pump and valves. With such an assembly it is possible to control the braking pressure of the connected wheel brakes independently by predetermining the brake pedal force in accordance with suitable criteria. This assembly enables a compact structure if the motor (1) is arranged on the one side of the intermediate housing (2) and the electronic control unit (3) is arranged on the other side. Electric connection between the control unit (3) and the motor (1) is effected by a line (20) passed through channels (21,22) in respectively the intermediate housing (2) and the control unit housing (4). The cross-section of the channels (21,22) is but slightly larger than the outside diameter of the line (20). This enables a massive, yet flexible line to be used which, supported by the channel walls within a connector (11), can be inserted into the printed circuit board of the electronic control unit. Further, a simple connector is suggested which can be soldered to a conductive track carrier.

17 Claims, 1 Drawing Sheet

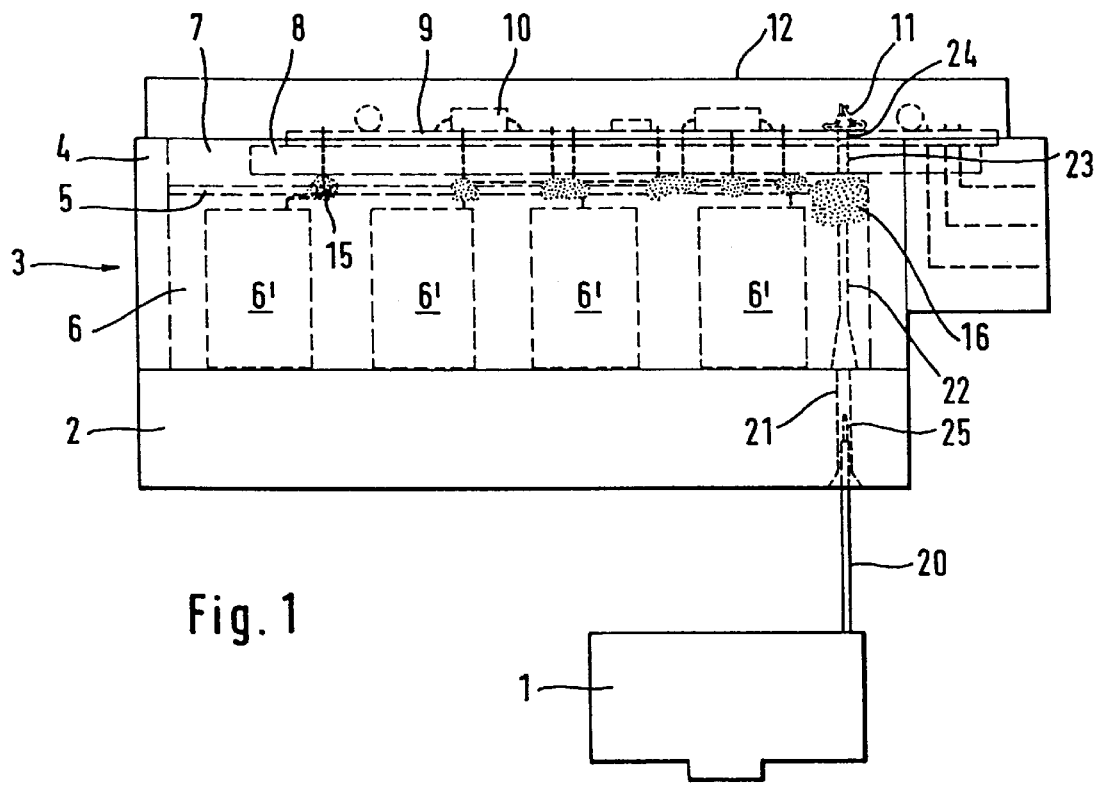
Fig. 1
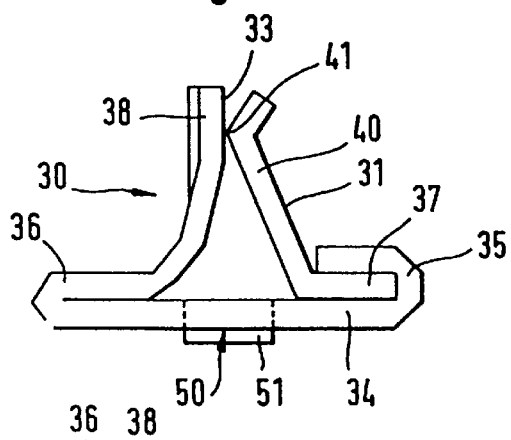
Fig. 2a
Fig. 2b
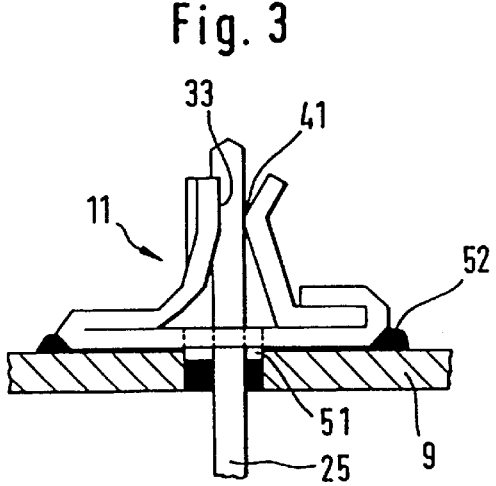
Fig. 3

ASSEMBLY OF MOTOR AND CONTROL UNIT

BACKGROUND OF THE INVENTION

This invention relates to an assembly comprising an electric motor, an intermediate housing with two outside surfaces as well as an electronic control unit.

Such an assembly is known from DE 43 20 005 A1. There, the intermediate housing forms a housing for a piston-type pump driven by the motor, with the intermediate housing in addition receiving solenoid valves. The assembly is provided for being used with a brake system. The electronic control unit controls both the motor and the solenoid valves.

The intermediate housing comprises two opposite outside surfaces so as to provide an assembly of compact structure, with the motor being fastened to one of the surfaces while the housing of the electronic control unit is attached to the other surface. Electric connection between the motor and the control unit is done by means of at least two electrical conductors passed through a bore in the intermediate housing. In accordance with the mentioned published patent application, the conductors are injected into a plastic sleeve adapted to form one piece with the end plate of the motor resting on the outside surface. Connected to the control unit is a connector and the bare ends of the electric conductors are inserted into this connector.

A different embodiment of the mentioned published patent application provides to pass a flexible cable through the opening and to insert it into the connector on the side of the control unit and to connect it with the brushes of the commutator on the side of the motor.

The disadvantage of the first embodiment is that the sleeve must feature a rigid design so as to ensure electric connection by means of the connector when the assembly is assembled.

The disadvantage of the second embodiment is that the electric motor cannot be prefabricated. Instead, it is necessary to pass the connecting line at first through the opening in the intermediate housing so as to enable it to be connected subsequently with the brushes on the mounting plate. Only then it will be possible to mount the housing of the electric motor.

It is therefore an object of this invention to ensure by simple means that the assembly can easily be mounted from prefabricated constructional units.

SUMMARY OF THE INVENTION

To this end, a motor and control unit assembly is suggested which is distinguished from the embodiment of DE 43 20 005 A1 by a channel which extends in the control unit and is in alignment with the channel in the intermediate housing, with both channels having an inside diameter which is but slightly larger than the outside diameter of the electrical conductor. This makes it possible to use a commercially available massive single-core type of line which, however, is flexible in itself and which is supported within the mentioned channels when the assembly is assembled. When the electric line is inserted into the connector, thus, a longitudinal force will be generated which is sufficient to ensure that the bared line end can be inserted into the connector without deflecting of the electric line.

Advantageously, the connector is provided within the control housing so that the electric line forms a constructional unit with the electric motor. This means that the electric motor can be pre-assembled together with the electric line. Since the construction of the electric line is flexible it is possible to bend the electric line aside during the transport of the motor.

The control unit comprises a separating wall subdividing the housing into two chambers at the minimum. One of the chambers receives the coils of the solenoid valves and its open side faces the intermediate housing. On a carrier in the other chamber which opens to the other side, there is a printed circuit board with conductive tracks whereto electronic components are soldered which form the control unit of the assembly. They are disposed on the side of the printed circuit board which is averted from the separating wall. The connector now is disposed on this very side so that it can be soldered to the printed circuit board in one operation, together with the electronic components. However, an embodiment is also conceivable where the conductive tracks are formed directly on the separating wall so that the separating wall forms both the carrier plate and the printed circuit board at the same time.

Beneath the separating wall, a chamber is arranged in an extension of the guiding channel. This chamber receives a sealing compound penetrated by the electric line. In this way, the electric line is sealed liquid-proof relative to the opening within the separating wall and the two chambers of the control unit housing are sealed liquid-proof relative to each other.

Namely, it cannot be avoided completely that, during the operation of the assembly, liquid will enter the chamber which receives the coils. However, it must be avoided at all events that this liquid will enter the other chamber with the conductive tracks and the electronic components.

A connector suitable for this configuration will be described in the following.

This connector comprises a basic body of tin-plated copper which may be soldered directly to the printed circuit board. This basic body has a contact surface for the wire end. A spring clip ensures that the wire end is pressed against this contact surface.

To enable the wire end to be inserted and removed easily into and from the clamping connector for respectively assembly and disassembly it is suggested to bend the pressure-applying surface of the spring clip along the wire, which is to be clamped, in both directions away from the wire.

Thus the spring clip will be free from edges which might notch the wire, causing it to get hooked to the spring clip in the form of a barb.

A simple type of construction of the connector consists in that the basic body comprises a strip which is bent several times so that, projecting from an abutment section, the two ends are bent inside in a U-shaped manner, one of the bendings serving to fasten the spring clip to one of the ends of the basic body. On the end of the other bending, an extension is provided which is bent upwards perpendicularly to the abutment section and whereon the contact surface is formed. In the center of the abutment section, there is an aperture which works as entry aperture for the wire end. Two flaps may be bent downwards from this aperture to engage a hole in the printed circuit board and to fix the connector there before being soldered to the printed circuit board.

In the following, this invention will be explained in more detail, reference being made to one example of an embodiment.

BRIEF DESCRIPTION OF THE DRAWINGS

In the drawings,

FIG. 1 is a fundamental representation of this assembly;

FIGS. 2a and 2b represent the embodiment of a connector; and

FIG. 3 is the connector with clamped wire.

DETAILED DESCRIPTION OF THE DRAWINGS

At first, reference is made to FIG. 1. The assembly comprises an electric motor 1, an intermediate housing 2 and a control unit 3.

Intermediate housing 2 serves to receive a piston-type pump as well as solenoid valves and thus is also referred to as valve block 2.

Control unit 3 comprises a housing 4 with a separating wall 5. A plurality of coils 7 is disposed in a first chamber 6 the open side of which faces valve block 2. These coils 7 are placed onto valve domes projecting from the valve block. Inside the domes there are guided the armatures for the actuation of the valve closure members. Above separating wall 5, there is another chamber 7 wherein a printed circuit board 9 is disposed on a carrier plate 8. The electronic components 10 as well as connectors 11 to be described in more detail below are disposed on the upper side of the printed circuit board. As already explained, the conductive tracks may also be disposed directly on the separating wall. The upper chamber 7 is sealed liquid-proof by a lid 12.

Separating wall 5 is provided with apertures 15 through which line are passed by means of which respectively the solenoids 7 and the motor 1 are connected with the conductive tracks on the printed circuit board 9. These apertures are sealed by silicon compound cushions 16 illustrated by dots which are penetrated by the electric line wires or rather by the connecting wires.

This permanently elastic sealing compound is for example a product bearing the product name of SIL Gel 6111 wei8 (white). The consistency of this sealing compound ranges between liquid and pasty and this sealing compound has a gluing effect so that any penetrating wire passing through it will be enclosed liquid-proof.

In this way, any liquids and/or oils entering chamber 6 containing the coils 7 because housing 4 is not safely sealed relative to valve block 2 will be prevented from entering chamber 7 containing the electronic components.

The control unit 3 will be pre-assembled by inserting the coils 7 and the electronic components into housing 4. Subsequently, the thus pre-assembled control unit will be mounted onto one of the sides of valve block 2. The motor 1 is likewise preassembled and provided with an electric line 20 which is to establish the connection to the electronic control system. Line 20 is a commercially available cable such as H07V-U(NYA) which is flexible and thus can be bent to abut the motor for the transport of the same.

To mount motor 1, line 20 is passed through a channel 21 within the valve block as well as through a channel 22 in housing 4. The two channels each extend perpendicularly to the surfaces of the sides of the valve block where respectively the motor and the control unit are fastened to.

In order to simplify insertion, both channel 21 in the valve block and channel 22 in control unit housing 4 have a funnel at their entries. The special feature, however, consists in that the diameter of channels 21, 22 is not essentially larger than the outside diameter of line 20 so that the channel walls support the electric line within the channels.

If now motor 1 is advanced towards valve block 2, line 20 with the bared line end 25 will move through channels 21 and 22 and approach printed circuit board 9. In doing so, at first it will penetrate the silicon compound 16 disposed in a chamber (not represented in detail) within housing 4 of the control unit. Then, the bared line end will pass through a channel 23 within the carrier 8 as well as a through bore 24 within the printed circuit board 9 which is in alignment with an aperture within the connector 11. Finally, line end 25 will be clamped within the connector, thus a gas-proof, vibration-resistant electric connection being established between the motor and respectively the conductive tracks and electronic components on the printed circuit board 9. Two electric connections will be needed as a rule, so that, in accordance therewith, two connectors and an appropriate number of channels are provided in valve block 2 and in housing 4.

By means of channels 21, 22 in respectively the valve block and the control unit housing, by means of the silicon compound 16 and by means of channels 23 within carrier 8 and by means of through bore 24 it will be ensured that a sufficient support is provided for line 20 in order to overcome the clamping forces without elastic line 20 getting loose or deflecting.

The connector may be designed as illustrated in FIGS. 2 and 3. FIG. 2 is a longitudinal section taken through a connector 11 consisting of a basic body 30 and of a spring clip 31. Basic body 30 is of tin-plated copper and essentially serves current conduction.

Spring clip 31 is made from a stainless steel alloy and essentially serves to press line end 25, which is to be clamped, against a respective contact surface 33 of the basic body. The spring clip should not be of a material which can be soldered with tin. This is to prevent the spring clip from being soldered to the contact surface, e.g., by means of a reflow soldering process.

Basic body 30 is formed by bending an oblong strip several times. The oblong strip forms an abutment section 34 the two ends 35, 36 of which are bent inwards. One of the ends thus engages foot 37 of the spring clip 31 whereby the same is retained on the basic body 30. After having been bent inwards, the other end 36 is bent once more upwards and approximately perpendicularly to abutment section 34 so as to form an arm 38 with a contact surface 33 formed on the inwards pointing surface thereof. Contact surface 33 is disposed approximately in the extension of the center of abutment section 34.

A section 40 of spring clip 31 extends from foot 37 of spring clip 31 and is perpendicular to abutment section 34. The upper end of section 40 of spring clip 31 is bent once more outwards, thus forming a bend 41.

Arm 30 as well as section 40 of the spring clip 31 extend so as to approach each other in the form of a funnel, the bent upper end of the spring clip coming to abut on contact surface 33. Contact surface 30 and/or bend 41 can be provided with guiding indentations. Bend 41 is slightly rounded towards the wire, which is to be introduced, thus the wire being enabled both to be inserted easily and to be removed without any resistance.

Provided within abutment surface 34 is an aperture 50 wherefrom two flaps 51 may be bent off which engage the aperture 24 of printed circuit board 9 and fix the connector before it is soldered to the printed circuit board 9.

FIG. 3 shows the connector with a clamped wire end 25. The connector 11 is soldered to printed circuit board 9 (solder 52). The wire end 25 is clamped between the contact surface 33 of up-bent arm 38 of basic body 30 and the bend 41 of the spring clip 31.

What is claimed is:

1. An assembly comprising an electric motor, an intermediate housing with two outside surfaces and a first channel, a control unit housing with a second channel aligned to the first channel, an electronic control unit comprising electronic components on conductive tracks, at least one connector as well as an electric line between the motor and the electronic control unit which is passed through the first and the second channel, at least one end of the electric line being inserted into the connector, and the two channels having an inside diameter which is but slightly larger than the outside diameter of the electric line, wherein the conductive tracks are formed on a printed circuit board placed onto a carrier provided with another channel which is in alignment with the insertion aperture of the connector, with the connector as well as the other electronic components being fastened on the side of the printed circuit board which is averted from the carrier.

2. An assembly as claimed in claim 1, wherein the connector is fastened to the conductive track carrier within the control unit and in that the electric line forms a constructional unit with the motor.

3. An assembly as claimed in claim 2, wherein the connector as well as the other electronic components are fastened to the same side of the carrier.

4. An assembly as claimed in claim 1, wherein the housing of the control unit is subdivided by a separating wall into two chambers, with one of the chambers receiving coils and its open side facing the intermediate housing, with the other chamber receiving the conductive track carrier, and in that the apertures in the separating wall between the two chambers are sealed by silicon cushions.

5. An assembly as claimed in claim 4, wherein the channel in the control unit housing ends in a chamber filled with silicon compound and in that the electric line is pressed through this compound when the electric motor is mounted.

6. An assembly as claimed in claim 1, wherein the connector is designed to receive a bared electric line end and comprising a basic body of tin-plated copper which at least has one contact surface, and a spring clip fastened to the basic body and clamping the electric line end against the contact surface.

7. An assembly as claimed in claim 6, wherein a bend of the spring clip is bent along the line end to be clamped, in both directions away from the line.

8. An assembly as claimed in claim 7, wherein an aperture is provided in the center of the abutment section which forms an entry aperture and wherein two flaps are bent away from this aperture.

9. An assembly as claimed in claim 6, wherein the connector is formed by a strip which forms an abutment section the two ends of which are bent inwards in a U-shaped manner where one end clamps the spring clip and where an extension of the other end is bent perpendicularly away from the abutment section in order to form the contact surface.

10. An assembly comprising an electric motor, an intermediate housing with two outside surfaces and a first channel, a control unit housing with a second channel aligned to the first channel, an electronic control unit comprising electronic components on conductive tracks, at least one connector as well as an electric line between the motor and the electronic control unit which is passed through the first and the second channel, at least one end of the electric line being inserted into the connector, and the two channels having an inside diameter which is but slightly larger than the outside diameter of the electric line, wherein the connector is designed to receive a bared electric line end and comprising a basic body of tinplated copper which at least has one contact surface, and a spring clip fastened to the basic body and clamping the electric line end against the contact surface.

11. An assembly as claimed in claim 10, wherein the connector is fastened to the conductive track carrier within the control unit and in that the electric line forms a constructional unit with the motor.

12. An assembly as claimed in claim 11, wherein the connector as well as the other electronic components are fastened to the same side of the carrier.

13. An assembly as claimed in claim 10, wherein the housing of the control unit is subdivided by a separating wall into two chambers, with one of the chambers receiving coils and its open side facing the intermediate housing, with the other chamber receiving the conductive track carrier, and in that the apertures in the separating wall between the two chambers are sealed by silicon cushions.

14. An assembly as claimed in claim 13, wherein the channel in the control unit housing ends in a chamber filled with silicon compound and in that the electric line is pressed through this compound when the electric motor is mounted.

15. An assembly as claimed in claim 10, wherein a bend of the spring clip is bent along the line end to be clamped, in both directions away from the line.

16. An assembly as claimed in claim 15, wherein an aperture is provided in the center of the abutment section which forms an entry aperture and wherein two flaps are bent away from this aperture.

17. An assembly as claimed in claim 10, wherein the connector is formed by a strip which forms an abutment section the two ends of which are bent inwards in a U-shaped manner where one end clamps the spring clip and where an extension of the other end is bent perpendicularly away from the abutment section in order to form the contact surface.

* * * * *